United States Patent

[11] 3,577,773

| [72] | Inventors | Moritada Kubo<br>Tokyo;<br>Kuniji Asano, Kawasaki-shi, Japan |
|---|---|---|
| [21] | Appl. No. | 860,753 |
| [22] | Filed | Sept. 24, 1969 |
| [45] | Patented | May 4, 1971 |
| [73] | Assignee | Tokyo Shibawra Electric Co., Ltd.<br>Kawasaki-shi, Japan |
| [32] | Priority | Sept. 30, 1968, Oct. 4, 1968 |
| [33] | | Japan |
| [31] | | 43/70226 and 43/71849 |

[54] METHOD AND APPARATUS FOR MEASURING THE PERCENTAGE OF ELONGATION OF METAL STRIPS
9 Claims, 5 Drawing Figs.

[52] U.S. Cl........................................... 73/67.7, 72/8, 72/11
[51] Int. Cl...................................................... G01n 29/00
[50] Field of Search............................................73/67, 67.2, 517; 72/10, 11, 8 (Inquired); 73/67.5—.9

[56] References Cited
UNITED STATES PATENTS

| 3,186,226 | 6/1965 | Milnes et al. ................. | 73/67.2X |
| 3,391,560 | 7/1968 | Mathey ........................ | 73/67.2 |
| 3,416,339 | 12/1968 | List ............................. | 72/8 |

Primary Examiner—Richard C. Queisser
Assistant Examiner—Arthur E. Korkosz
Attorney—Flynn & Frishauf ABSTRACT: The percentage of elongation of a rolled metal strip is measured by apparatus comprising a plurality of spaced apart magnetic or ultrasonic detectors which are disposed along a line parallel to the direction of movement of the metal strip and not in contact therewith. Signals produced by adjacent pairs of detectors are compared to obtain difference signals which are squared and then added together to provide a signal representing the percentage of elongation of the metal strip.

15''. Thus, the output $E_L$ accurately represents the displacement $y$ at portions of the strip corresponding to respective detectors. Such nonlinear circuits may be readily manufactured by utilizing polygonal line approximation function circuits comprising resistors and diodes.

When the outputs of the detecting circuits 8 are linearized as above described, the following equation 1 holds true between the output $E_L$ of the nonlinear circuit and the displacement $y$ irrespective of the magnitude of the latter.

$$E_{Li} = k \cdot y_i \, (i=1, 2, \ldots, m) \quad \ldots\ldots\ldots 1$$

where $k$ represents a constant determined by the characteristics of the circuit.

The difference between a pair of adjacent outputs $E_L$ is determined by the subtracting circuit 10, the difference is squared by the squaring circuit 11 and the squared values are added by the addition circuit 12 to provide an output $E_n$ expressed by equation 2.

$$E_n = k^2 \sum_{i=1}^{m-1} \delta y_i^2 \quad (2)$$

Assuming now that the waveform of the portions of the strip facing toward respective detectors 4 be shown by an equation $y=f(a)$ as shown in FIG. 3, the percentage of elongation of the strip over a length $L=(m-1)\Delta x$ will be expressed by the following equation.

$$l_n = \frac{\sum_{i=1}^{m-1} \sqrt{1+(\Delta y_i/\Delta x)^2} \cdot \Delta x - (m-1) \cdot \Delta x}{(m-1) \cdot \Delta x} \quad (3)$$

Inasmuch as the wave length of the wave created in the strip 1 is much longer than its amplitude, $(\Delta yi/\Delta)1$. Substituting this condition in equation 3, we obtain $$l_n = \frac{1}{2(m-1)\Delta x^2} \sum_{i=1}^{m-1} \Delta y_i^2 \quad (4)$$

In equation 4 by putting $$\frac{1}{2(m-1n)\Delta x^2} = k^2$$

equation 2 can be derived. Thus, the output $E_n$ of the addition circuit 12 in FIG. 1 represents the percentage of elongation of the length $(m-1)\Delta Bx$.

It is advantageous to select spacing $\Delta x$ between adjacent detectors to be less than one-half of the minimum wave length of the waves created in the strip, whereas two detectors are sufficient when the waves are travelling at the running speed of the strip. Thus the distance $\Delta x$ and the number of detectors should be determined after due consideration of the characteristics of waves so that it should be understood that the number of detectors is by no means limited to the particular number illustrated.

As above described, according to this invention, the nonlinear characteristics inherent in magnetic detectors are corrected or linearized by the utilization of nonlinear circuits whereby the displacement of the strip can be accurately detected so as to accurately measure the percentage of elongation over a certain length of the strip in the direction of running. When the rolling mill is controlled by the compensated signals it is possible to reduce irregularities of the rolled strips and hence to increase their flatness.

Although in the illustrated example, detectors are provided along only one longitudinal line of the strip, it is possible to arrange them along more than one spaced apart longitudinal lines, for example, lines at the center and edges of the strip.

FIG. 4 shows a connection diagram of a modified embodiment of this invention. In this example a plurality of ultrasonic oscillators $14_1, \ldots, 14_m$ are arranged on a longitudinal line $x'$ with equal spacings $\Delta x$. Each one of these ultrasonic oscillators is connected to a pulse oscillator 16 having a period T through a switch 15, and to one of pulse amplifiers $18_1, 18_2, \ldots, 18_m$ through one of switches 17. Switches 15 are constructed such that they are closed when pulses are generated by pulse oscillator 16 whereas switches 17 are constructed such that they are opened when pulses are generated by the pulse oscillator 16. Pulses generated by pulse oscillator 16 are supplied to the ultrasonic oscillators 14 to excite them and ultrasonic waves emitted from the ultrasonic oscillators are reflected by the surface of the wave strip back to the ultrasonic receivers (not shown) associated with respective oscillators to generate electric signals which are supplied to pulse amplifiers $18_1, \ldots, 18_m$. Outputs from these amplifiers are supplied to integrators $19_1, \ldots, 19_m$ which are connected to also receive pulses from the pulse oscillator 16 to produce outputs $e_1, \ldots, e_m$. Each integrator is constructed and arranged such that it is reset by a first pulse from the pulse oscillator 16 to commence to integrate a constant voltage contained therein at a constant speed, to enter into the holding state upon receipt of a second pulse and to continue this holding state until it receives a third pulse. The construction of such integrators is well known in the art.

Two adjacent outputs $e$ (for example $e_1$ and $e_2$, $e_2$ and $e_3$ ...) are paired and the paired outputs are supplied to $(m-1)$ subtractors $20_1, \ldots, 20_{m11}$ to provide outputs corresponding to differences $\Delta e$ ($\Delta e_1, \ldots, \Delta e_{m11}$) of respective output pairs. These outputs are supplied to squaring circuits 21 ($21_1, \ldots, 21_{m11}$) to produce squares of differences $\Delta e^2$ ($\Delta e^2_1, \ldots, \Delta e^2_{m11}$) which are added by an addition circuit 22. The output $E_n$ is applied to a sample holder 23 to provide an output $E_n'$. The pulses from the pulse oscillator 16 are supplied to sample holder 23 through a delay circuit 24 which delays the pulses by an interval $\tau$. The output $E_n'$ is supplied to the crown control device of the strip mill.

The operation of the embodiment shown in FIG. 4 will now be considered with reference to FIG. 5. Although respective ultrasonic oscillators 14 are excited at the same time by the pulse from the pulse oscillator 16, receivers associated with respective ultrasonic oscillators receive reflected sound waves at different times depending upon distances $y_1, y_2, \ldots, y_m$ between ultrasonic oscillators (and receivers) and the wavy surface of the strip. As shown in FIG. 5a, since integrators 19 are simultaneously reset by the (N—1) the pulse from the pulse oscillator 16 to simultaneously commence to integrate but are held by signals which are supplied by the ultrasonic receivers at different times the amplitudes of the integrated waves or the amplitudes of the outputs $e$ from integrators 19 are different dependent upon deviations $y_1, \ldots, y_m$ of the strip at portions thereof facing toward the ultrasonic oscillators. As a consequence, output $\Delta e$ (FIG. 5b) from a subtracting circuit 20 corresponds to the difference of deviations at adjacent points on the strip 1 and is represented by $$\Delta ei = l_{i+1} - l_i \, (i=1, 2, \ldots, m-1) \ldots\ldots 5$$

The output $E_n$ from the adder 22 which acts to add the outputs (FIG. 5c) from the difference squaring circuits 21 is expressed by equation 6 and is shown by FIG. 5d.

$$E_n = \sum_{i=1}^{m-1} \Delta e^2 i \quad (6)$$

Since the sample holder 23 is connected to receive pulses from the pulse oscillator 16, which are delayed by an interval $\tau$, to hold samples when all integrators 19 are set in the holding state, it can provide a continuous voltage output $E_n'$ as shown in FIG. 5e.

The amplitudes of outputs from integrators 19, when they are in hold states, are different dependent upon such factors as distances $y$ between ultrasonic oscillators 14 and strip 1, velocity of the sound, integration constants of integrators 19 and the like. Thus, as these outputs are proportional to

METHOD AND APPARATUS FOR MEASURING THE PERCENTAGE OF ELONGATION OF METAL STRIPS

The invention relates to a method and apparatus for measuring percentage of elongation of metal strips during rolling thereof and more particularly to a method and apparatus for measuring percentage of elongation of metal strips during rolling operation by means of magnetic flux or ultrasonic waves.

In the rolling operation of metal strips when the percentage of elongation differs at different portions of the strips, such strips become wavy thus greatly decreasing their commercial value. Typical examples of rolled strips of undesirable configuration are those wherein the percentage of elongation of the strip at the longitudinal center thereof is higher than that at the side edges and wherein the percentage of elongation at the side edges is higher than that at the longitudinal center of the strip. To eliminate such undesirable configurations a device has been proposed wherein the extent of the undesirable configuration of the strip is detected during the rolling operation and the detected signal is utilized to control the crown of the rolls of a rolling mill. However, when the strip is running at high speed, in order to correctly detect the irregularities in the strip configuration such detecting devices should not mechanically contact with the running strip. For this reason, practical methods and apparatus for detecting irregularities in the strip configuration are not yet commercially available.

However, apparatus for measuring the flatness of the strip after rolling operation has been proposed. According to one type, a magnetic detector including a magnetic core wound with a coil is disposed adjacent to but not in contact with the surface of a magnetic strip. The strip is moved in the longitudinal direction with respect to the detector to detect the change in the air gap between the core and the strip to vary the inductance of the coil. The variation in the inductance is detected by any suitable means such as an AC bridge circuit. However, application of such a detector is limited to rolled magnetic strips, and can not be used to the control of the configuration of any metal strip during rolling. Moreover, as the magnitude of the signal produced by such a detector is not always proportional to the percentage of elongation of the strip being rolled it is impossible to use such a signal as the contour control signal. This is because the wave length of the waves formed in the strips undergoing the rolling operation is not always constant but varies irregularly with the result that, even at a constant amplitude of the wave, the percentage of elongation of the strip is high when the wave length is long and vice versa.

In addition, as the waveform of the strip created during rolling operation is very complicated, in order to provide accurate measurement of the percentage of elongation it is necessary to provide a plurality of detectors across the width of the strip and to properly treat output signals thereof. Moreover, as characteristics of such a magnetic detector are nonlinear, in other words, each detector does not accurately detect the distance between it and the strip it is impossible to have accurate measurement of the percentage of elongation of the strip unless some correcting means is provided.

Accordingly, it is an object of this invention to provide an improved method and apparatus for accurately measuring the percentage of elongation of a metal strip without mechanically contacting therewith.

Another object of this invention is to provide a method and apparatus for measuring the percentage of elongation of a magnetic metal strip by means of magnetic detectors without the disadvantage of their nonlinear characteristics.

Briefly stated, according to this invention deflection or wavy configuration of a rolled metal strip is measured by means of magnetic or ultrasonic detectors which are disposed along a line parallel to the direction of movement of the metal strips. These detectors are spaced from each other by a definite spacing and are disposed close to but not in contact with the surface of the metal strip to produce first signals representing the distances between respective detectors and the portions of the metal strip facing thereto. Signals of adjacent detectors are applied to subtracting circuits to produce second signals corresponding to the difference between pairs of first signals and these second signals are then squared. The squared difference signals are then summed up to produce a third signal representing the percentage of elongation of the metal strip which is utilized to control the crown of the rolls of the rolling mill producing the metal strip. Where magnetic detectors are used nonlinear circuits are included to compensate for the nonlinear characteristics of their outputs.

Further objects and advantages together with the organization and operation of the invention can be more fully understood from the following detailed description taken in conjunction with the accompanying drawings, in which.

Figure 1:
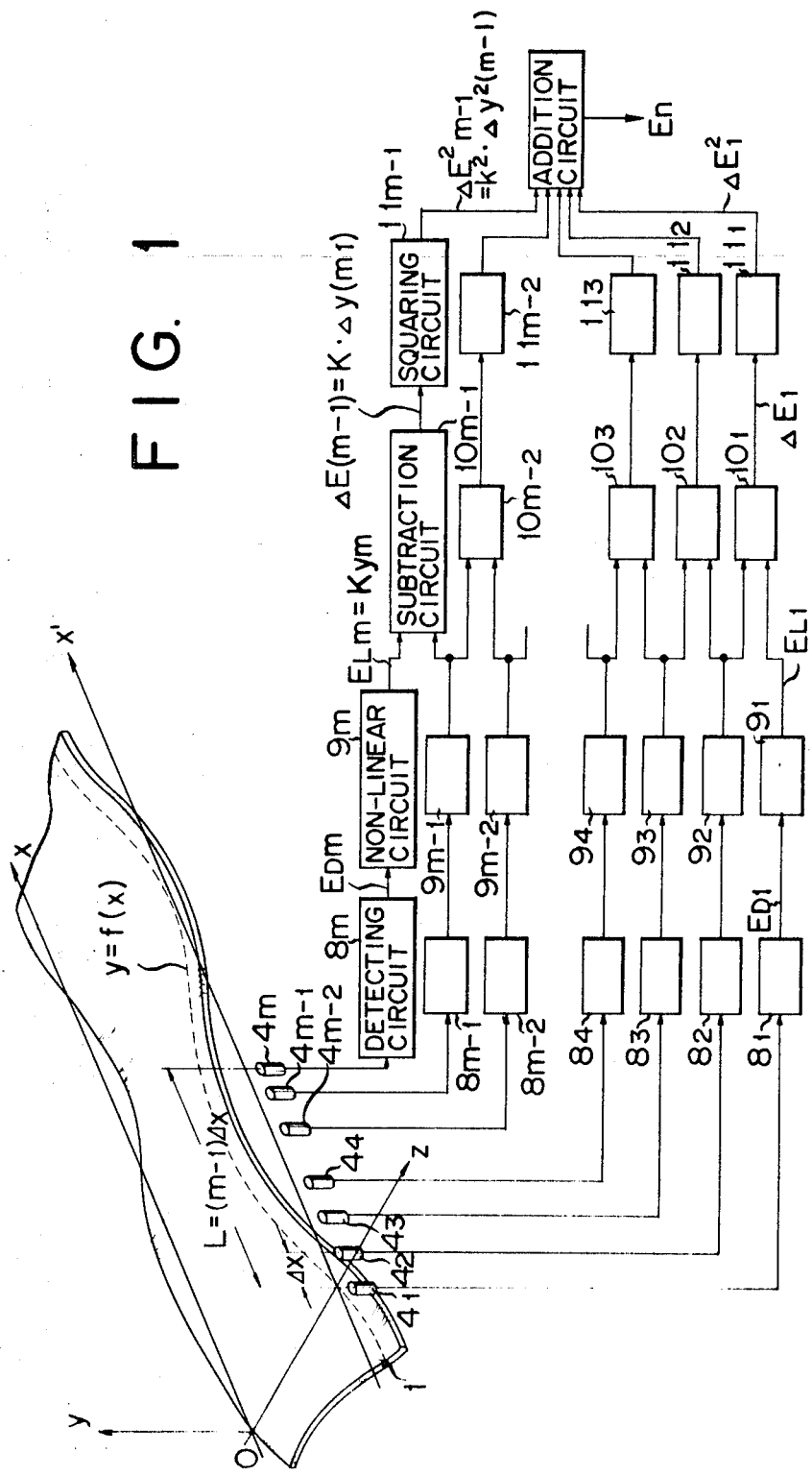
FIG. 1 shows a perspective view of a metal strip of a typical irregular contour together with a block diagram of one embodiment of the invention utilizing magnetic detectors.
Figure 2:
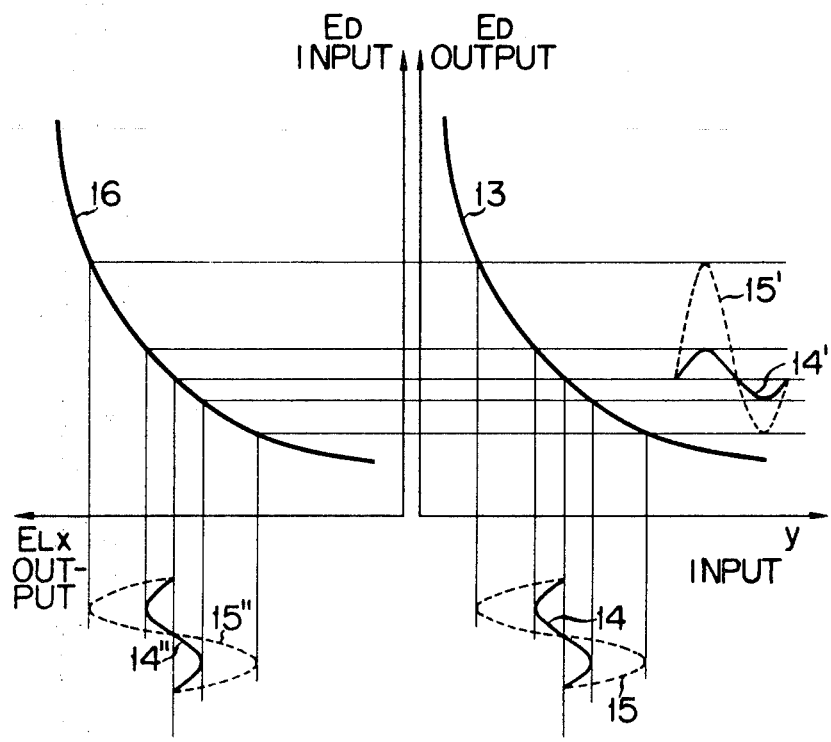
FIGS. 2 and 3 are plots helpful to understand the operation of the embodiment shown in FIG. 1.
Figure 3:
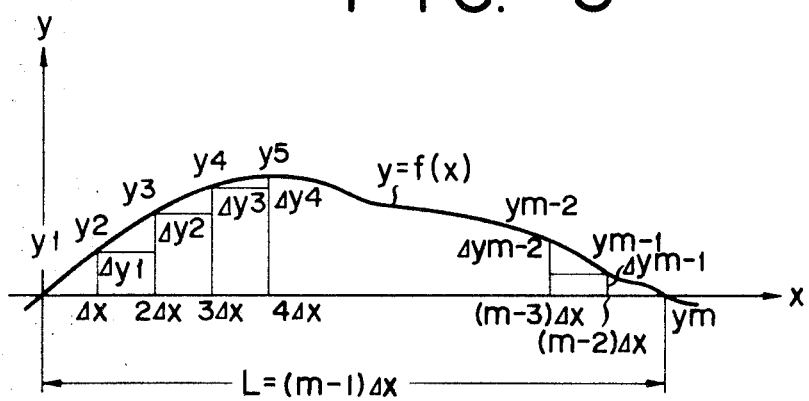
Figure 4:
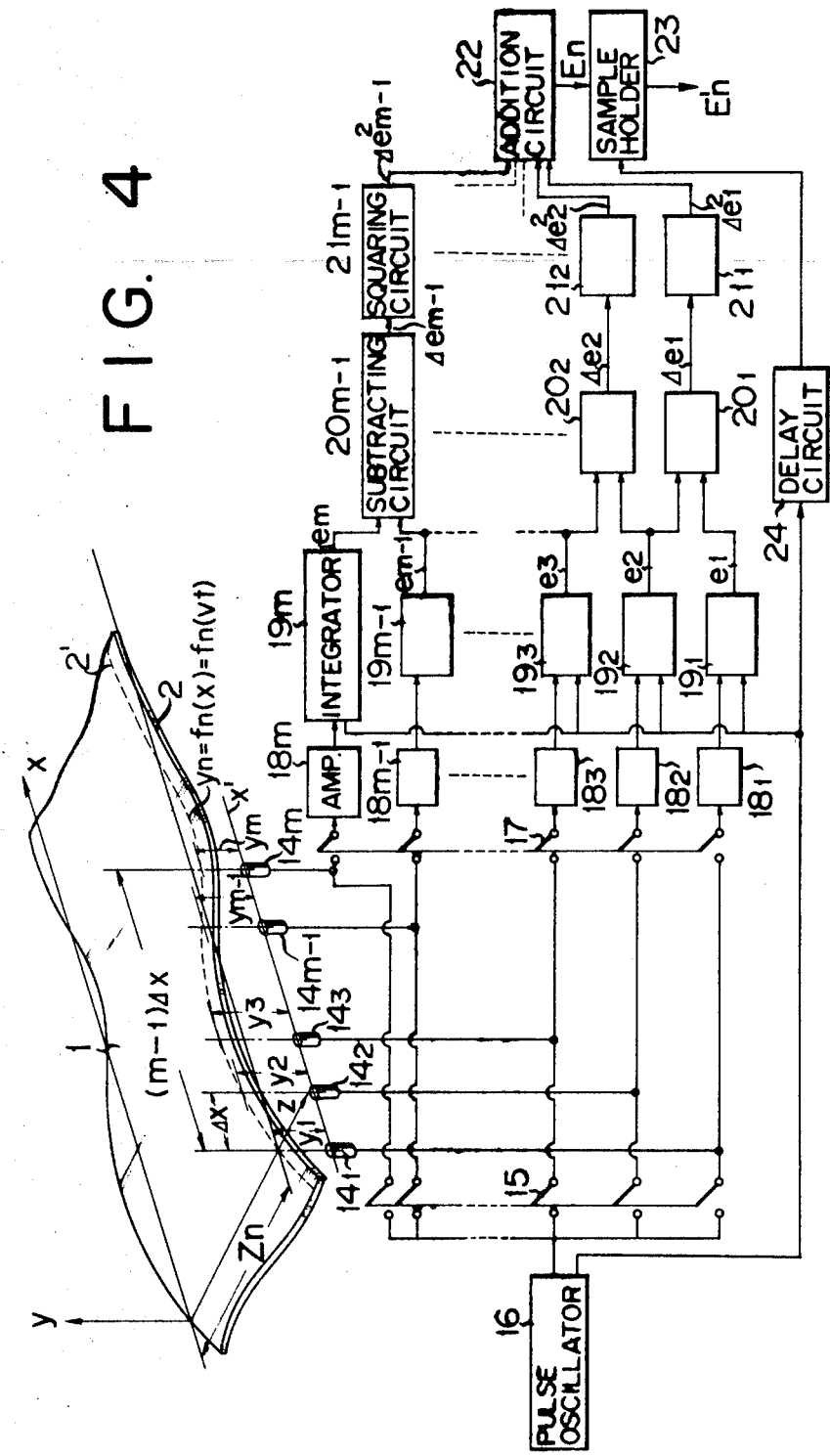
FIG. 4 is a view similar to FIG. 1 but showing a modified embodiment of this invention utilizing ultrasonic detectors.
Figure 5:
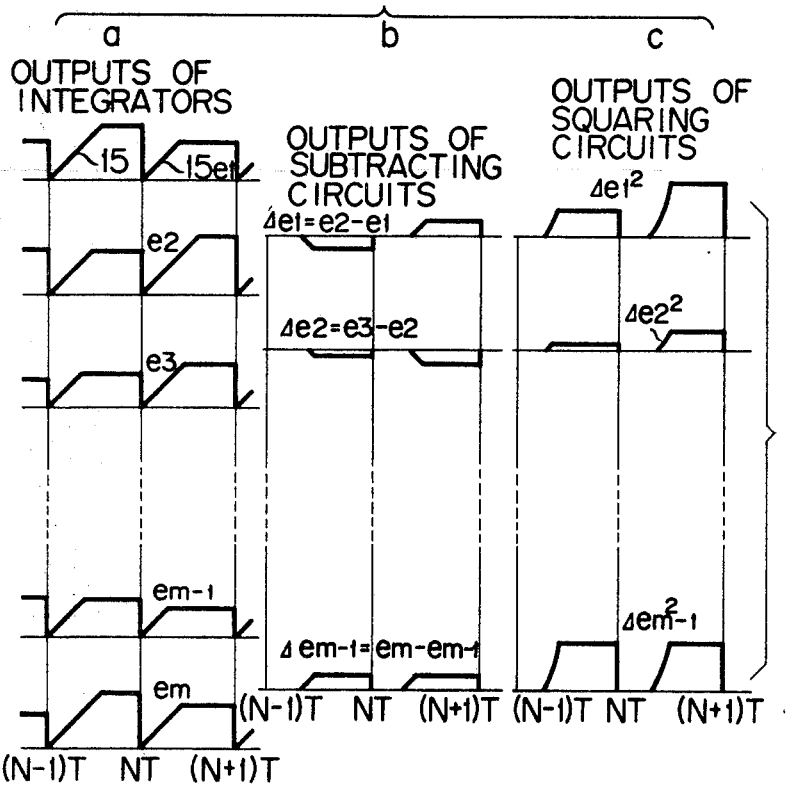
FIG. 5 shows waveforms of various signals to explain the operation of the apparatus shown in FIG. 4.
Figure 5:
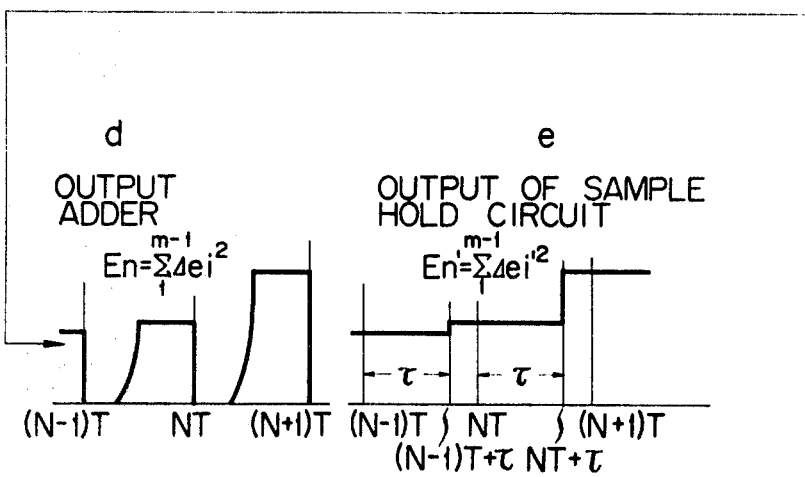

With reference now to FIGS. 1 to 3, a plurality of (for example $m$) magnetic detectors $4_1, 4_2, ... , 4_m$ are disposed close to but not mechanically in contact with a metal strip 1 (magnetic in this example) along a line $x'$ which is parallel to a line $x$ passing through the origin 0. Magnetic detectors are spaced apart by equal distance $\Delta x$ and are connected to detecting circuits $8_1, 8_2, ... , 8_m$, respectively. Outputs $E_{D1}, E_{D2}, ... , E_{Dm}$ from detecting circuits $8_1, 8_2, ... , 8_m$ are supplied to nonlinear circuits $9_1, 9_2, ... , 9_m$ to be described later to obtain linear outputs $E_{L1}, ... , E_{Lm}$, adjacent outputs are paired and these pairs are supplied to subtraction circuits $10_1, 10_2, ... , 10_{m11}$ to provide differences $\Delta E_1, \Delta E_2, ......, \Delta E_{m11}$, respectively which are supplied to squaring circuits $11_1, 11_2, ... , 11_{m11}$ to obtain squared values $\Delta E_1^2 \Delta E_2^2 ... , \Delta E_{m11}^2$. These squared values of the differences are applied to an addition circuit 12 to obtain an output $E_n$ representing the percentage of elongation of the strip.

In the above described arrangement, the distance $y$ between each detector 4 and a point on the strip facing thereto represents the displacement of the strip during running. As the waveform $y=F(x)$ of the strip changes during rolling operation in a very complicated manner, the distance $y$ also varies continuously. Where the displacement $y$ is small, the output ED of the detecting circuit is nearly proportional to the displacement. However, as the displacement increases the effect of the nonlinear property inherent to the magnetic detector becomes substantial. More particularly, detectors corresponding to portions of the strip where the displacement is small produce output signals substantially proportional to displacement $y$, while detectors corresponding to portions where the displacement is large do not produce output signals proportional to the displacement $y$. Since in accordance with this invention, percentage of elongation of the strip length $(m-1).\Delta x$ is measured by means of a plurality of detectors, should some detectors accurately measure the displacement $y$ and others not, high accuracy of the measurement as well as the wide range of measurement can not be expected.

According to this embodiment, this problem is solved by the use of nonlinear circuits 9.

The operation of the nonlinear circuits 9 will now be considered with reference to FIG. 2. As shown by curve 13, the output $E_D$ from the magnetic detecting circuit 8 is nonlinear. For small displacements 14 shown by the abscissa the outputs 14' shown by the ordinate vary substantially proportionally whereas for large displacements the outputs 15' will be greatly distorted. When nonlinear circuits 9 having a characteristic as shown by curve 16 are connected to the detecting circuits 8 the outputs 14' and 15' will be linearized as shown by 14" and distances y as above described, the output $E_n'$ can be expressed by $$E_n' = k^2 \sum_{i=1}^{m-1} \Delta y_i^2 \qquad (7)$$

which is similar to equation 2 and wherein $k$ represents a proportionality constant. This output voltage $E_n'$ varies stepwisely with a period of $\tau$ in response to the variation in the contour of the strip.

Assuming that the waveform of the wave 2 of the strip 1 at a given instant be given by $$yn(x) = Fn(vt) \qquad \dots\dots\dots 8$$

where $v$ represents the running speed of the strip and $t$ the time. When the wave form is sampled at an interval of $\Delta x$, the percentage of elongation $l_n$ of the strip over a length $(m-1)\Delta Bx$ would be approximately given by $$l_n = \frac{\sum_{i=1}^{m-1} \sqrt{1+(\Delta y_i/\Delta x)^2} - (m-1)\Delta x}{(m-1)\cdot \Delta x} \qquad (9)$$

which is similar to equation 3. Again by substituting the condition that $(\Delta y_i/\Delta) \ll 1$ in equation 8, we obtain $$l_n = \frac{1}{2(m-1)\Delta x^2} \sum_{i=1}^{m-1} \Delta y_i^2 \qquad (10)$$

In equation 10 by putting $$\frac{1}{2(m-1)\Delta x^2} = k^2$$

we can derive equation 7.

Thus, the percentage of elongation of the strip which varies from time to time can be represented by the output $E_n'$ of the sample hold circuit 23 which varies stepwisely at an interval of $\tau$. When passed through a low pass filter not shown, the percentage of elongation of the strip can be measured as a continuous analogue voltage. It is to be understood that the sample holder 23 may be omitted it the holding time of the integrators 19 is considerably longer than the integration time thereof.

In this modified embodiment since the deflection at various points of the strip or an irregular configuration is determined by detectors utilizing ultrasonic waves so as to measure the percentage of elongation, detected signals have better linearity than those produced by magnetic detectors shown in FIG. 1. In addition, the strip to be measured is not limited to magnetic material but is only required to reflect ultrasonic waves.

We claim:

1. A method of measuring the percentage of elongation of a rolled metal strip comprising the steps of disposing a plurality of detecting means along a line parallel to the direction of movement of said metal strip, said measuring means being spaced from each other by a predetermined definite spacing and disposed close to but not in contact with the surface of said strip to produce first signals representing the distances between respective measuring means and portions of said surface of said strip opposing said measuring means, producing second signals corresponding to the difference between output signals of pairs of adjacent detecting means, squaring said difference signals and adding said squared difference signals to produce a third signal representing the percentage of elongation of said metal strip over a length along which said plurality of measuring means are disposed.

2. A method of measuring the percentage of elongation of a rolled metal strip according to claim 1 wherein said metal strip is magnetic and said detecting means comprises magnetic detectors each including an electromagnet, the reactance of the coils thereof being varied according to the deflection of said metal strip.

3. A method of measuring the percentage of elongation of a rolled metal strip according to claim 2 wherein a nonlinear circuit is connected to each one of said magnetic detectors to compensate for the nonlinear characteristics thereof.

4. A method of measuring the percentage of elongation of a rolled metal strip according to claim 1 wherein said detecting means comprises a plurality of ultrasonic transmitters and receivers to generate said first signals.

5. A method of measuring the percentage of elongation of a rolled metal strip according to claim 1 wherein said third signal is utilized to control the crown of rolls of a rolling mill which produces said metal strip.

6. An apparatus for measuring the percentage of elongation of a rolled strip mill comprising a plurality of detecting means disposed along a line parallel to the direction of movement of said metal strip, said detecting means being spaced from each other by a predetermined definite spacing and disposed close to but not in contact with the surface of said strip to produce first signals representing the distances between respective measuring means and portions of said surface of said metal strip opposing said measuring means, means to produce second signals corresponding to the difference between output signals of pairs of adjacent detecting means, squaring circuits to square said difference signals and means to add said squared difference signals to produce a third signal representing the percentage of elongation of a metal strip over a length along which said plurality of measuring means are disposed.

7. An apparatus for measuring the percentage of elongation of a rolled magnetic metal strip comprising a plurality of magnetic detectors disposed along a line parallel to the direction of movement of said metal strip; each one of said magnetic detectors including a magnetic core and a coil and disposed close to but not in contact with the surface of said metal strip so as to produce a first signal representing the distance between said magnetic core and the portion of said metal strip facing thereto; nonlinear circuits connected to said magnetic detectors to linearize the outputs thereof; a plurality of subtracting circuits to produce difference signals respectively corresponding to the difference between outputs of pairs of adjacent nonlinear circuits; squaring circuits to square respective one of said second signals and an addition circuit to sum up said squared difference signals to produce a third signal representing the percentage of elongation of said metal strip.

8. An apparatus for measuring the percentage of elongation of a rolled magnetic metal strip comprising a plurality of ultrasonic detectors disposed along a line parallel to the direction of movement of said metal strip; said ultrasonic detectors being disposed close to but not in contact with the surface of said metal strip; said ultrasonic detectors transmitting ultrasonic pulse waves toward the surface of said metal strip and receiving ultrasonic pulse waves reflected thereby so as to produce first signals representing the distances between said detectors and corresponding portions of the surface of said metal strip; a pulse source energizing said ultrasonic detectors; integrating circuits controlled by the output from said pulse source to respectively integrate said first signals; a plurality of subtracting circuits to produce difference signals respectively corresponding to the difference between outputs of pairs of adjacent integrating circuits; squaring circuits to square outputs from said subtracting circuits; and an addition circuit to sum up outputs from said squaring circuits to produce a third signal representing the percentage of elongation of said metal strip.

9. An apparatus for measuring the percentage of elongation of a rolled metal strip according to claim 6 wherein said third signal is utilized to control the crown of rolls of a rolling mill which produces said metal strip.